United States Patent [19]

West et al.

[11] Patent Number: 4,953,287

[45] Date of Patent: Sep. 4, 1990

[54] THERMAL-BONDING PROCESS AND APPARATUS

[75] Inventors: William J. West, Los Altos; Howard H. Taub, San Jose; Robert J. Miller, Burlingame, all of Calif.

[73] Assignee: Hewlett-Packard Company, Palo Alto, Calif.

[21] Appl. No.: 68,874

[22] Filed: Jul. 1, 1987

[51] Int. Cl.⁵ ............................................. H05B 3/00
[52] U.S. Cl. ........................................ 29/611; 29/829; 29/846; 29/729; 29/743; 156/285; 156/497; 156/583.3; 219/243
[58] Field of Search ................. 29/611, 729, 743, 825, 29/829, 846; 219/243; 156/285, 497, 583.3

[56] References Cited

U.S. PATENT DOCUMENTS

| | | | | |
|---|---|---|---|---|
| 2,489,643 | 11/1949 | Hunter | ................................ | 219/243 |
| 2,509,439 | 5/1950 | Langer | ................................ | 219/243 |
| 3,533,352 | 10/1970 | Miller | ................................ | 156/583.3 |

FOREIGN PATENT DOCUMENTS 6341  1/1978  Japan ..................................... 156/285

Primary Examiner—P. W. Echols
Attorney, Agent, or Firm—William H. F. Howard

[57] ABSTRACT

An orifice plate is thermally bonded to a thick film photopolymer spacer fabricated on a print head substrate using heat and compression. The compression is applied by pressurized gas to a pliable sheet covering the orifice plate and substrate assembly. Heat can be supplied through a vacuum chuck on which the assembly is mounted or from a heating element embedded in the pliable sheet. An apparatus comprising an air actuated ram with a flange having an o-ring seated within is used to seal the pliable sheet against the vacuum chuck circumferentially about the assembly. The ram includes a chamber with an open end which is sealed against the pliable sheet when in an engaged position. By filling the chamber with gas under sufficient pressure while heating the spacer forms a bond between the orifice plate and the assembly. After thermal bonding, curing of the photopolymer spacer can be completed in an oven.

10 Claims, 3 Drawing Sheets

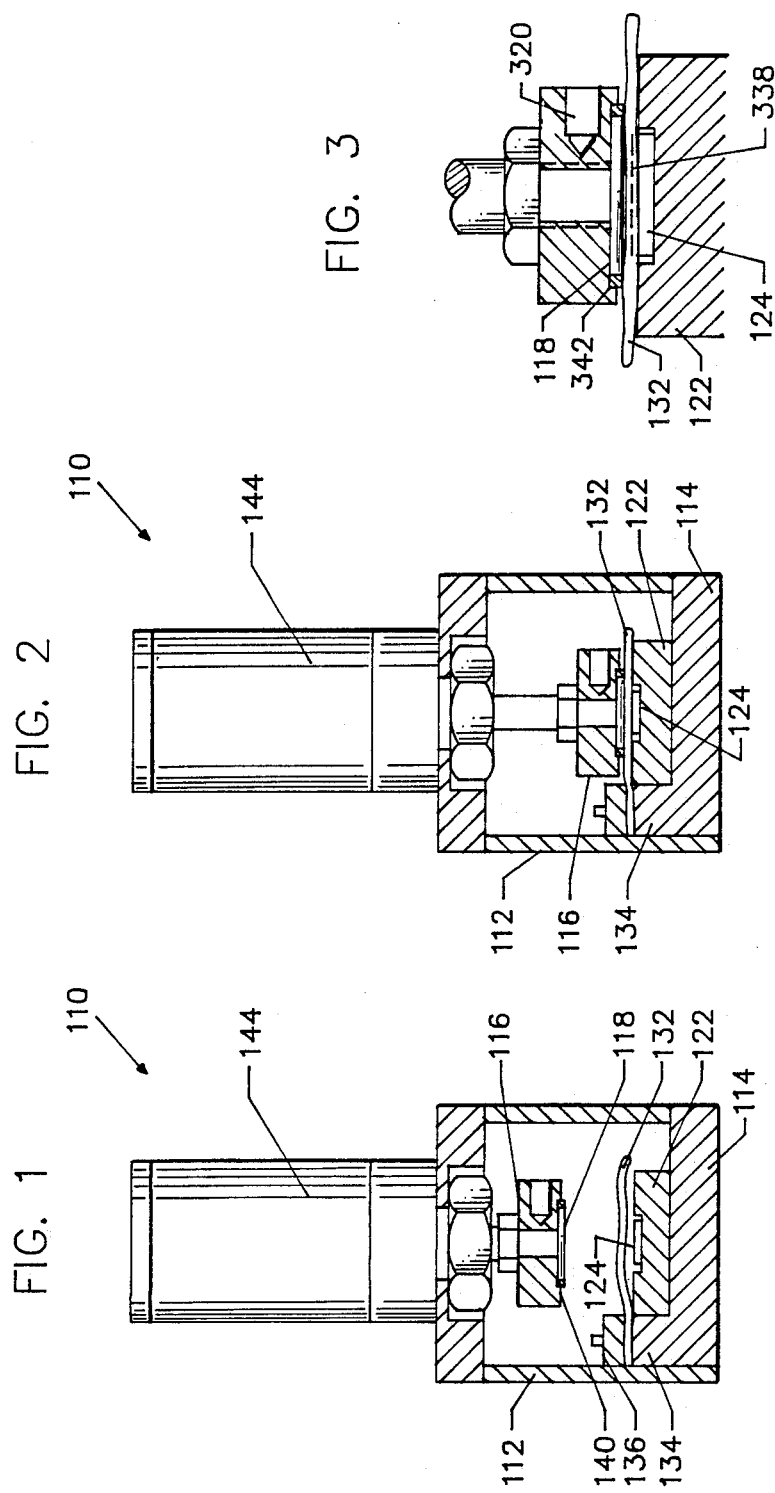

THERMAL-BONDING PROCESS AND APPARATUS

BACKGROUND OF THE INVENTION

The present invention relates to a method and apparatus for assembling print heads for ink jet printers and, more particularly, to such an apparatus and method using heat and pressurized fluid to adhere a photopolymer used to bond and space the substrate and orifice plate.

For high print quality, strict tolerances are applicable to the relative spacing and orientation of the substrate and orifice plate of the print head of a thermal ink jet printer. Accordingly, a major objective of the present invention is to provide for more precise control of spacing and parallelism in the manufacture of such print heads.

Thermal ink jet printers comprise one of two major types of drop-on-demand ink jet printers. Drop-on-demand ink jet printers are contrasted with continuous stream ink jet printers which use electrodes to direct ink toward or divert ink from a recording medium, such as paper. Drop-on-demand ink jet printers tend to be simpler than continuous stream printers since the former do not require electrode assemblies to control ink trajectories or recirculation systems to collect and recycle ink diverted from the recording medium. The other major type of drop-on-demand ink jet printers eject ink in response to a control signal by mechanically applying pressure to ink to eject it through one or more orifices.

Thermal ink jet printers, also known as bubble jet printers, have emerged as versatile sources of high-quality printing. Thermal ink jet printers use heat to vaporize some component of the ink to form a vapor bubble. The volumetric expansion of the vapor bubble forces adjacent liquid ink to be expelled through an orifice and propelled toward a recording medium.

Generally, a print head for a thermal ink jet printer includes a substrate and an orifice plate spaced by material which is patterned to define channels through which ink can flow. The substrate is fabricated according to conventional semiconductor processing techniques and includes electrical current paths with resistors in series with conductors. The orifice plate is mounted parallel to the substrate, with orifices generally aligned over respective resistors. When, in response to a control signal, current is caused to flow through one of the resistors on the substrate, sufficient heat is generated to vaporize a component of the nearby ink so as to create a bubble within a respective channel. As ink is expelled through the orifice, the bubble collapses and the print head is soon ready for another cycle.

The relatively quiet operation perceived by a user of such a printer belies a violent and complex flow of events on the scale of the components of the print head. The dimensions of each ink channel, and thus the spacing between the substrate and the orifice plate, must fall within strict tolerances to achieve a precise and predictable droplet trajectory and volume despite the rapid growth and collapse of the vapor bubbles and the turbulence of the ink liquid and vapor.

Tolerances are even more critical in the usual case in which the print head has multiple printing elements and orifices. To create images at reasonable rates, most drop-on-demand ink jet printers use at least nine printing elements. Multi-color ink jet printers can use three or four sets of printing elements for single-pass color printing. For accurate registration of colors and high quality printing, the dimensions of the channels corresponding to each orifice and the alignment of the components must be held to tight tolerances. Failure to hold the orifice plate parallel with respect to the substrate, results in an increase in manufacturing costs as quality control rejects unsatisfactory printers and components.

Addressing the problem of attaching the substrate and orifice plate with these tolerances in mind, it has been found that most procedures using a separate adhesive are unsatisfactory, at least as to yield. The range of suitable adhesives is limited by the structure and operating environment of a thermal ink jet head. The adhesive must be able to tolerate the thermal, mechanical, and chemical stresses of such an environment. In particular, the adhesive must be compatible with the ink which can be corrosive. Also, the adhesive must be light weight to minimize print head inertia.

One class of adhesives well suited to such an environment are UV-curable polymers. Unfortunately, since the orifice plate is usually opaque, it can be difficult to cure the adhesive once it is in position. Generally, the orifice plate must be positioned prior to the application of adhesive, although screen printing of an adhesive on the substrate or orifice has been attempted without much success. Positioning the adhesive is a delicate task, requiring a syringe or other precise applicator.

In addition to bonding the substrate and orifice, the adhesive is required to complete a seal for the fluid channels. Adhesive applied irregularly to the channel barriers can create a plug in one of the channels, interfering with ink flow or causing ink to leak or, in a color printer, mix. Where the substrate and orifice plate are positioned using a vacuum hold down, a small air gap could cause adhesive to be drawn toward the vacuum source the result being complete or partial blockage of an ink channel.

A "thermal bonding" process has been developed at Hewlett-Packard Company. In a thermal bonding process, heat and pressure are used to fuse one material to a different material. The basic idea is to use the spacer material, which forms the side-walls for the ink channels, as the adhesive. In this approach, a thick film polymer, such as Dupont Vacrel, is patterned over the thin film layers on the substrate and photolithographically processed so as to define the channel barrier structures and a spacer for the substrate and the orifice plate.

Prior to the thermal bonding process, the thick film polymer is partially cured using ultraviolet light exposure of 5-10 Joules/cm$^2$. The substrate and orifice plate are then aligned and held together temporarily by a small dollop of adhesive, or vacuum or other technique. The patterned substrate and the orifice plate are then clamped between two hard-tooled nominally parallel, surfaces. The substrate and orifice plate are heated so that the polymer barrier becomes "tacky". As the hard-tooled surfaces apply pressure, the softened polymer spacer bonds to the orifice plate. A final high temperature cure cycle further strengthens the bond and completes polymerization.

This "thermal bonding" process works well when the surfaces applying the pressure are parallel and the print head components are of uniform thickness. However, the required tolerances for parallelism and uniform thickness are not easily achieved. These tolerance requirements can be relaxed by inserting a mechanical buffer layer between one of the pressure-applying surfaces and the assembly to be thermally bonded.

For example, the pressure-applying tool can include a stationary base and a movable upper tool with nominally parallel opposing faces. The movable upper tool can incorporate a heating element for rendering the spacer tacky. The mechanical buffer is a layer of paraffin, or other substance with a low melting point, enclosed between two layers of aluminum foil. This paraffin sandwich can be placed over the components.

The movable upper tool is then lowered to contact the paraffin sandwich Once the paraffin melts, pressure is applied to the components through the paraffin sandwich which conforms to the orifice plate so that pressure is applied uniformly. Thus the paraffin sandwich corrects for small deviations in parallelism.

While the paraffin-sandwich approach appears to work, it has a number of disadvantages. Despite the improved tolerances provided by the paraffin, a high degree of parallelism is still required between the upper tool and the base. However, to maintain adequate parallelism over the range of applied temperatures and pressures requires a high degree of fixture complexity. This complexity, then, impacts cost and reliability of the manufacturing process. Manufacturing costs are further aggravated by the use of an expensive, non-standard, consumable, the paraffin sandwich. Also, this approach puts the print head at risk of contamination if the paraffin leaks.

In addition, the paraffin-sandwich approach lacks flexibility. Process parameters including times temperatures and pressures are sensitive to the area of the components being joined. This makes it difficult to change print head types to be assembled at a given assembly station. It is, a fortiori, impractical to batch process, i.e., join the components of each of many assemblies at one time.

Accordingly, prior to the present invention, there has been a need for an improved apparatus and method for joining print head components. In particular, there is a need for such an apparatus and method which provides for high yields and yet is simple, economical, flexible in application, and mechanically tolerant.

SUMMARY OF THE INVENTION

In accordance with the present invention, the pressure required in a thermal bonding process is applied to the components to be joined by a fluid-impervious pliable sheet exposed on one side, the side opposite to the components, to pressurized fluid, which may be a gas or a liquid. Under pressure, the pliable sheet conforms to the surface of the component it contacts. Fluid pressure applied to the pliable sheet is distributed uniformly to the underlying orifice plate, relaxing requirements as to thickness uniformity. The pliable sheet further seals the assembly interior from the pressurized fluid to maintain the pressure differential between the interior and exterior of the assembly required for the thermal bonding process.

Preferably, the heat required in the thermal bonding process can be provided by a heating element in the pliable sheet. For example the pliable sheet can be a sheet with a heating element embedded within. Alternatively, the heating element can be part of a base or vacuum chuck upon which the assembly to be bonded is placed and which opposes the pressure applied by the pliable sheet under pressurized fluid.

Accordingly, the present invention provides for an apparatus comprising a base, a heat source and means for applying fluid under pressure to a pliable sheet disposed over an assembly positioned on the base. The apparatus can include the pliable sheet, or the pliable sheet can be a separate element. The heat source can be integrated with the base or with the pliable sheet.

The method of the present invention commences with the formation of the components to be joined, e.g., the print head substrate and orifice plate. The spacer is preferably fabricated on the substrate, but can be fabricated on the orifice plate or be embodied as a separate element to be joined with both the substrate and the orifice plate. These components are then placed in their ultimate positions in the desired assembly.

The components are then covered on at least one side of the assembly with the pliable sheet which can conform to the adjacent surface of the assembly and prevent pressurized fluid applied on the outside of the pliable sheet from filling the interior of the assembly. The assembly is heated and compressed by pressurized fluid applied to the pliable sheet until the spacer material softens and joins with one or both of the orifice plate and the substrate. Depending on the spacer material, a subsequent cure step can be used.

Since the pliable sheet conforms to the adjacent assembly surface, this process is relatively tolerant of variations in assembly thickness Furthermore, the present invention obviates a problem faced by the prior thermal bonding apparatus e.g. parallelism of the base and upper tool.

A reusable pliable sheet can be of products available from DuPont, in which case, the requirement for a nonstandard consumable is avoided. Alternatively, aluminum foil can serve as an inexpensive consumable pliable sheet. Either way, the costs and risks of the paraffin sandwich are avoided.

Since the invented method is more tolerant of thickness variations and does not require precise parallelism in the apparatus, it can scale readily to different assemblies and can permit concurrent joining for several assemblies. In particular, substrates with spacer patterns can be bonded to respective orifice plates while both components are in wafer form. The delicate task of cutting the wafers can be postponed until it is clear that all other steps have been successful.

Thus, the apparatus and method of the present invention provides for simple and economical joining of components such as the substrate, spacer material and orifice plate of a thermal ink jet print head. Greater flexibility is provided in that process parameters do not require delicate readjustment when the print head type is changed and in that concurrent joining for multiple print heads is readily provided. Higher yields are obtainable due to the inherent tolerance of the method to non-uniformities in assembly thickness. Lower costs result from higher yields, simplified procedures, lack of expensive consumables, and flexibility of the method. These and other advantages are apparent from the detailed description below with reference to the following drawings.

BRIEF DESCRIPTION OF THE DRAWINGS

FIG. 1 is a sectional view of a thermal bonding apparatus in accordance with the present invention shown in a retracted condition.

FIG. 2 is a sectional view of the thermal bonding apparatus of FIG. 1 shown in an engaged thermal bonding condition.

FIG. 3 is a detailed sectional view of a portion of the thermal bonding apparatus of FIG. 1 showing an air port into an air chamber.

DESCRIPTION OF THE PREFERRED EMBODIMENTS

Figure 4:
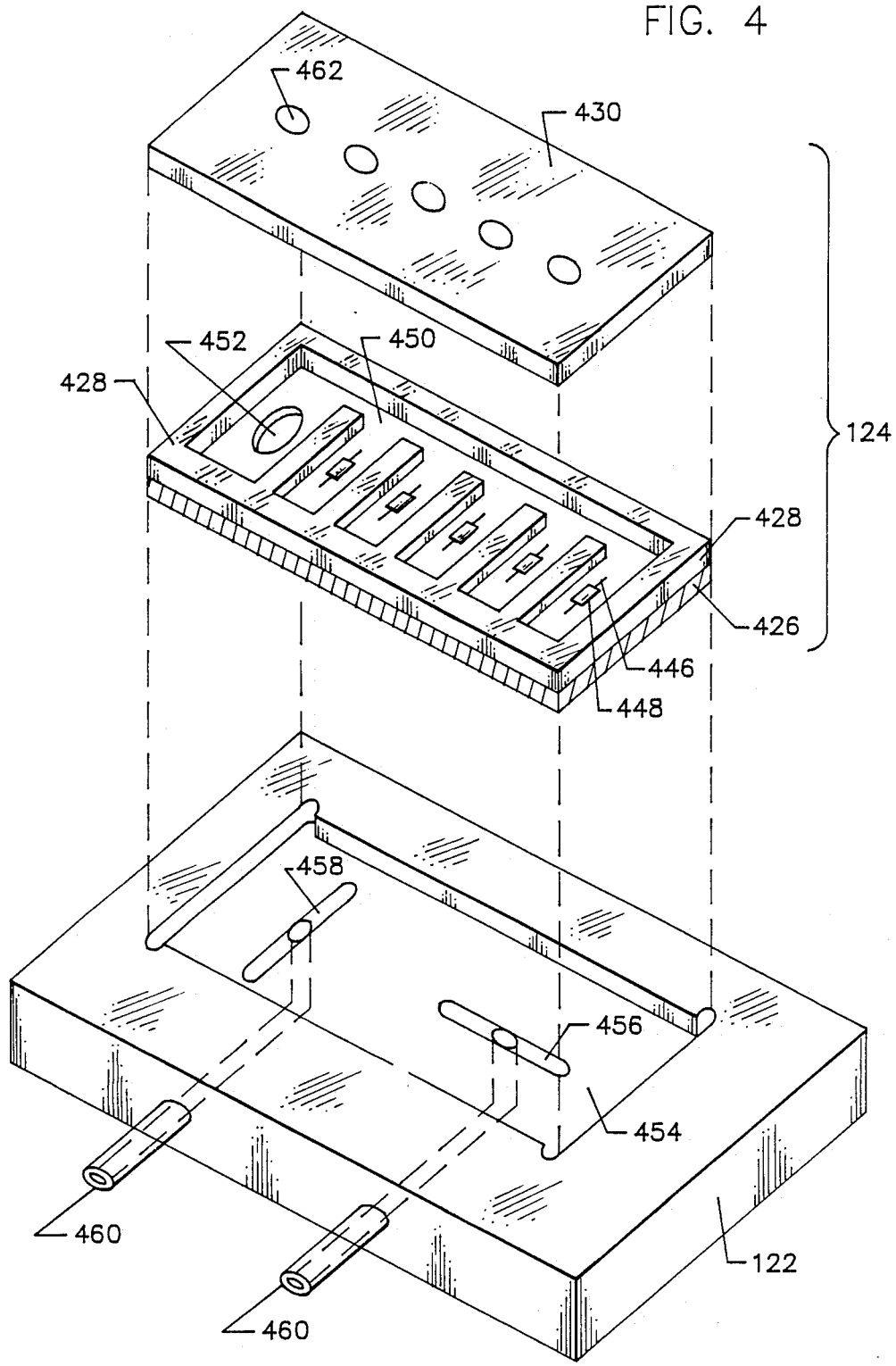
FIG. 4 is an exploded view of a vacuum chuck and print head assembly of the apparatus of FIG. 1.
Figure 5:
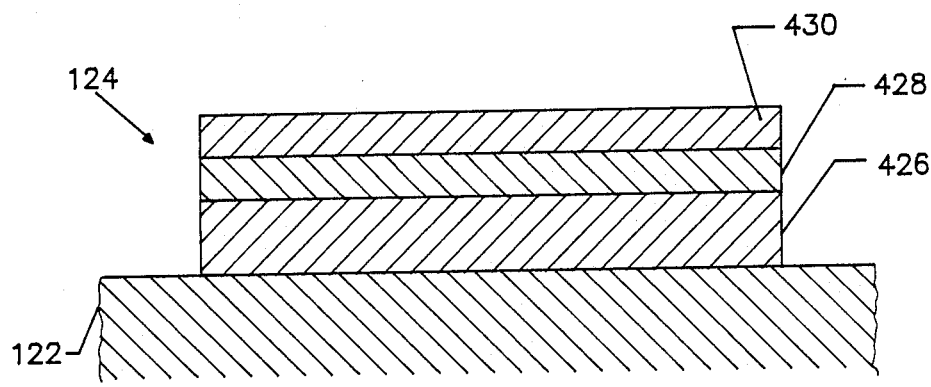
FIG. 5 is a sectional side view of the print head assembly of FIG. 4.

A thermal bonding apparatus 110 includes a frame 112, a base 114 and a ram 116, as shown in FIG. 1. The ram 116 can alternately assume a retracted position for loading, as shown in FIG. 1, and an engaged position for thermal bonding, as shown in FIG. 2. The ram 116 includes a chamber 118 and an air port 320, best seen in FIG. 3, for injecting and evacuating gaseous material into the chamber 118.

The base 114 is shown supporting a vacuum chuck 122, which is in turn supporting and holding a print head assembly 124. The print head assembly 124 includes a substrate 426 with thick film spacer 428 fabricated thereon and an orifice plate 430 positioned on the spacer 428, as indicated in FIG. 4. A pliable sheet 132 is fixed between an upwardly extending portion 134 of the base and a cap 136 bolted thereto, as shown in FIG. 1. The illustrated pliable sheet 132 includes a heating element 338 embedded therein.

The ram 116 includes a flange 140 with an O-ring seal 342, as shown in FIG. 3, seated in a square-shaped groove to conform roughly to the assembly 124. When the ram 116 is driven to its engaged position, as shown in FIG. 2, by actuation of an air cylinder 144, the 0-ring 342 presses the pliable sheet 132 against the vacuum chuck 122, the 0-ring seal 342 forming a seal with the pliable sheet 132 for the chamber 118. The seal extends circumferentially about the assembly 124. At this point, the assembly 124 is substantially enclosed by the combination of the vacuum chuck 122 and the pliable sheet 132.

Thermal bonding is effected as the assembly is concurrently compressed and heated. The heat can be supplied by the heating element 338 embedded in the pliable sheet 132. As indicated below, alternative embodiments can supply the heat in different ways. Compression is achieved by admitting pressurized air or nitrogen into the chamber 118 through the air port 120. The pressurized gaseous material in the chamber 118 forces the pliable sheet 132 to conform to the orifice plate 430, which, in turn, is forced against the spacer 428.

The print head assembly 124 can be prepared for thermal bonding as follows. The print head substrate 426 includes various circuit elements such as conductors 446 and resistors 448, shown in FIG. 4, which can be fabricated on a silicon wafer using conventional thin-film techniques. A thick film photopolymer, such as DuPont Vacrel, is deposited on the substrate 426 to form the spacer 428. Prior to orifice plate alignment, the photopolymer must be UV cured at an exposure of about 5–10 Joules/cm$^2$. In the illustrated embodiment, the spacer 428 is patterned to define ink channels 450. Accordingly, the desired spacer can be defined by a conventional deposition, masking, exposure, and etching sequence. An ink port 452 is formed through the substrate 426. Where several substrates are being fabricated on a single wafer, the wafer can be split at this point.

The substrate 426 is mounted in a recessed portion 454 of the vacuum chuck 122. The vacuum chuck 122, which can be fabricated from aluminum, is preferably formed so that this recessed portion 454 conforms to the length and width of the substrate 426 so that the pliable member 132 is not stressed at the edges of the print head assembly 124 when the thermal bonding apparatus 110 is in its engaged position. The vacuum chuck 122 includes two manifolds, a substrate manifold 456 and an orifice plate manifold 458, both of which can be evacuated of air through vacuum outlets 460. Evacuation of the substrate manifold 456 is used to fix the substrate 426 to the vacuum chuck 122.

The ink port 452 is positioned over the orifice plate manifold 458. When properly aligned, the orifice plate 430 extends over this ink port 452. A sufficient vacuum applied via the orifice plate manifold 458 serves to fix the position of the orifice plate 430 relative to the substrate 426. Since the orifice plate 430 includes small orifices 462, and since there can be gaps between the spacer 428 and the orifice plate 430, a vacuum source used to evacuate the manifolds 456 and 458 must evacuate the interior of the assembly 124 faster than it can be filled through these openings.

The vacuum chuck 122 is placed on the base 114 against its upwardly extending portion 134, as shown in FIG. 1. Generally, the pliable sheet 132 is pre-fixed between this portion 134 and the mounting cap 136. In this case, the vacuum chuck 122 is slid into position beneath the pliable sheet 132.

Once the print head assembly 124 is in position, the air cylinder 144 can be actuated, driving the ram 116 toward the base 114. The 0-ring seal 342 presses the pliable sheet 132 against the flat top surface of the vacuum chuck 122. The region of contact between the pliable sheet 132 and the vacuum chuck 122 is determined by the circular flange 140. The O-ring 342 in the flange seals against the pliable sheet 132 rendering the air chamber 118 of the ram 116 gas tight.

Heat and gas pressure are applied concurrently. The heat is applied by passing current through the heating element 338. Pressure is applied by forcing air or nitrogen under pressure through the air port 320, best seen in FIG. 3. In the present method, about a minute is allotted for the spacer 428 to reach a suitable thermal bonding temperature, in this case about 168° C.

Once a suitable thermal bonding temperature, e.g., 150° C., is achieved, a pressure, e.g., 190 pounds per square inch (psi), is applied long enough for the softened photopolymer material of the spacer 428 to adhere to the metal of the orifice plate 430. After about 2 minutes, the heating element 338 can be switched off and the pressure released through the air port 320. The assembly 124 is then inserted into an oven at 160° C. for 60 minutes to complete the cure of the photopolymer spacer material.

Figure 6:
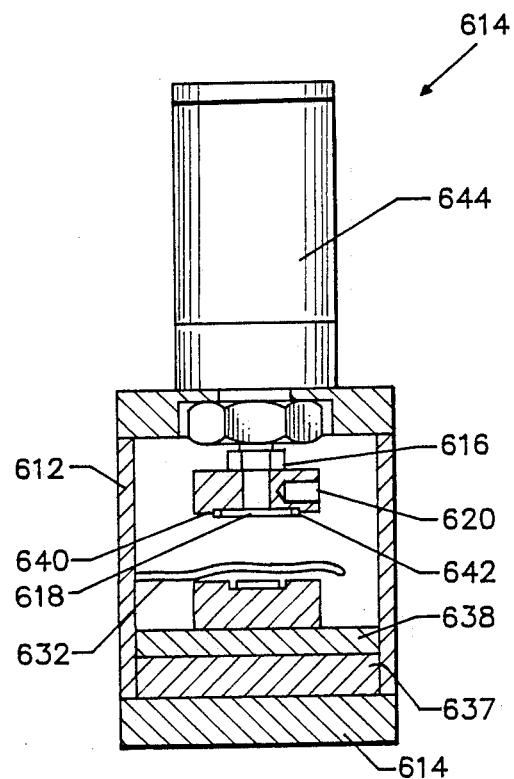
FIG. 6 is a sectional view of an alternative thermal bonding apparatus in accordance with the present invention.

An alternative thermal bonding apparatus 610, provided by the present invention and shown in FIG. 6, uses a pliable sheet 632 of aluminum foil, without an embedded heating element. Instead, the thermal bonding apparatus 610 includes a heater block 638 upon which an assembly to be joined, with or without a vacuum chuck, can be placed.

This thermal bonding apparatus 610 includes a frame 612 with a base 614. An insulator block 637 supports and thermally insulates the heater block 638 from the base 614. The frame 612 supports a ram 616, which is essentially the same as the ram 112 in the thermal bonding apparatus 110 described above. The ram 616 included an air cylinder 644, an air chamber 618, an air port 620, a flange 640 and an O-ring 642, all serving the same functions as the corresponding components in the first thermal bonding apparatus 110. As a variation on the second thermal bonding apparatus, a heating element can be integrated into a vacuum chuck.

One of the features shared by the foregoing embodiments is that the pressure applied to the assembly during thermal bonding is a function primarily of the gas pressure, and is essentially independent of the size of the assembly. In approaches using a mechanical press, the applied force has to be adjusted to compensate for changes in the area over which force is to be applied. Furthermore, when a mechanical press is used, it is much more difficult to ensure that the force is applied evenly over the relevant surface.

Since the present invention easily adjusts to different size assemblies and since it has little problem in applying pressure uniformly, a single apparatus can accommodate a variety of print head assembly shapes and sizes. Furthermore, it is relatively straightforward to scale an apparatus for wafer scale thermal bonding.

While the foregoing embodiments of the present invention are shown in relation to the manufacture of print heads for thermal ink jet printers the invention is not sensitive to the ultimate purpose of the assembly, and thus is applicable to thermal bonding other assemblies with similar requirements. The present invention provides for many alternatives approaches to positioning the orifice plate and the substrate, to heating the spacer material, and using gaseous material to apply pressure to effect a bond. The apparatus can be fabricated with different means for supplying pressurized gas. In fact, the pressure could be applied by compressing a fixed volume of gas. These and other modifications to and variations of the described embodiments are provided by the present invention, the scope of which is limited only by the following claims.

What is claimed is:

1. A method of fabricating a print head for a thermal ink printer, said method comprising the steps of:
   fabricating a print head substrate including at least one resistor in series with two conductors, said print head substrate being fabricated by etching patterns in thin films of conductive and insulating materials deposited over said substrate;
   fabricating a photopolymer spacer on said print head substrate by depositing a thick film photopolymer on said print head substrate and etching a pattern in said thick film photopolymer;
   forming an ink port through said print head substrate;
   fabricating an orifice plate with at least one orifice;
   forming and maintaining an assembly by placing said orifice plate in contact with said spacer and substantially parallel with said print head substrate, said forming and maintaining step further involving placing said assembly on a vacuum chuck with the print head substrate in contact therewith and evacuating gaseous material from between said print head substrate and said vacuum chuck to fix their relative positions, and evacuating gaseous material through said ink port from between said substrate and said orifice plate so as to fix their relative positions;
   covering said assembly with a pliable sheet;
   disposing an air chamber over said assembly so that said air chamber forces said pliable sheet to contact said vacuum chuck about said assembly; and
   concurrently heating said spacer and filling said chamber with pressurized gaseous material so that said pliable sheet is pressed against said orifice plate so that said spacer bonds with said orifice plate.

2. The method of claim 1 wherein said concurrently heating and filling step involves applying heat from a heating element embedded in said pliable sheet.

3. The method of claim 1 wherein said concurrently heating and filling step involves applying heat through said vacuum chuck.

4. A method comprising the steps of:
   (a) fabricating a plurality of generally planar components, including:
      (i) a substrate for a thermal ink jet print head;
      (ii) an orifice plate for a thermal ink jet print head; and
      (iii) a thermal bonding spacer means;
   (b) fabricating an ink port through the substrate;
   (c) forming an assembly by arranging the components to be substantially parallel with each other and spaced apart by the spacer means;
   (d) positioning the assembly on a vacuum chuck;
   (e) maintaining the relative position of the substrate and the orifice plate by evacuating a gaseous material if any from between the substrate and the orifice plate;
   (f) placing the assembly between a rigid surface and a fluid- impervious pliable sheet; and
   (g) concurrently heating and compressing the spacer means, to thereby thermally bond the spacer means to at least one of the planar components, and wherein the compressing step is achieved by applying fluid pressure to the pliable sheet.

5. A method for bonding a precision laminate comprised of at least two layers, the method comprising the steps of:
   a. positioning a precision laminate on a vacuum chuck between a base and a thin pliable sheet, the pliable sheet when subjected to a pressure differential being capable of:
      i. pressing against the precision laminate; and
      ii. conforming precisely to the surface contours of the precision laminate so that a uniform pressure is applied to a surface of the precision laminate;
   b. maintaining the positioning of the precision laminate when applying heat and pressure to the precision laminate by maintaining a partial vacuum in the vacuum chuck;
   c. heating the precision laminate; and
   d. applying a uniform pressure to the surface of the precision laminate by applying a pressure differential across the thin pliable sheet by using a chamber in which is defined an inlet outlet port and an opening that the thin pliable sheet is placed across so that a fluid-tight chamber is formed, wherein the application of heat and uniform pressure bonds the precision laminate together.

6. The method defined in claim 5, wherein the thin pliable sheet of the positioning step is a thin aluminum foil.

7. An apparatus for bonding a precision laminate comprised of at least two layers, the apparatus comprising:
   a. a base;
   b. a first means, formed as a thin pliable sheet means for responding to a pressure differential by:
      i. pressing against the precision laminate; and
      ii. conforming precisely to the surface contours of the precision laminate so that a uniform pressure is applied to the surface of the precision laminate;
   c. a second means, formed for holding the precision laminate between the base and the first means;
   d. a third means, formed for heating the precision laminate; and
   e. a fourth means, formed for applying a pressure differential across the first means using a chamber defining an inlet/outlet port and defining an opening that the first means is placed across so that a fluid-tight chamber is formed.
   f. a fifth means, formed for maintaining the relative position of the layers of the precision laminate by maintaining a partial vacuum between the layers during the application of heat and pressure.

8. The apparatus defined in claim 7, wherein the first means is a sheet of Kevlar film.

9. The apparatus defined in claim 7, wherein the first means is a sheet of aluminum foil.

10. The apparatus defined in claim 7, wherein the second means further comprises:
   a sixth means, formed for maintaining the position of the precision laminate when applying heat and pressure to the precision laminate by maintaining a partial vacuum in the second means.

* * * * *